United States Patent [19]

Voss

[11] 4,074,992
[45] Feb. 21, 1978

[54] SODIUM ION-EXCHANGE ON SURFACE OF BETA-SPODUMENE

[75] Inventor: Raymond O. Voss, Corning, N.Y.

[73] Assignee: Corning Glass Works, Corning, N.Y.

[21] Appl. No.: 784,635

[22] Filed: Dec. 18, 1968

Related U.S. Application Data

[63] Continuation-in-part of Ser. No. 365,117, May 5, 1964, abandoned.

[51] Int. Cl.² .................... C03C 3/22; C03C 21/00
[52] U.S. Cl. ........................ 65/30 E; 65/33; 106/39.7
[58] Field of Search .............. 65/30, 33, 114, 30 E; 117/124; 106/39 DV, 39.7

[56] References Cited

U.S. PATENT DOCUMENTS

| | | | |
|---|---|---|---|
| 3,157,522 | 11/1964 | Stookey | 65/33 X |
| 3,218,220 | 11/1965 | Weber | 65/30 X |
| 3,428,513 | 2/1969 | Denman | 65/33 X |
| 3,647,489 | 3/1972 | McMillan et al. | 65/30 X |

FOREIGN PATENT DOCUMENTS

| | | |
|---|---|---|
| 1,439,341 | 4/1966 | France. |
| 1,105,434 | 3/1968 | United Kingdom. |

OTHER PUBLICATIONS

G. B. Carrier; "Electrol Microscopic Technique for Determining the Percent Crystallinity of Glass-- Ceramic Materials;" Journal of the American Ceramic Society, vol. 47, No. 8, Aug. 1964.

Ohlberg et al., "Crystal Nucleation by Glass in Glass Separation;" Symposium on Nucleation and Crystallization in Glasses and Melts; The American Ceramic Society, 1962; pp. 55–62.

Karsbetter et al.; "Chemical Strengthening of Glass Ceramics in the $Li_2O-Al_2O_3-SiO_2$ System"; May 1966; all pages.

Tashiro et al.; "Glass Ceramics Catalized with Zirconia"; 5th International Congress on Glass; 7-14-62; all pages.

Kistler, S. S., "Stresses in Glass Produced by Nonuniform Exchange of Monovalent Ions", J. of Am. Cer. Soc., vol. 45, No. 2, pp. 59–68, Feb. 1962.

Primary Examiner—Richard V. Fisher
Attorney, Agent, or Firm—Clinton S. Janes, Jr.; Clarence R. Patty, Jr.

[57] ABSTRACT

This invention relates to the strengthening of glass-ceramic articles wherein the crystal content thereof comprises the predominant portion and containing beta-spodumene solid solution as the principal crystal phase. The strengthening is effected by means of an ion exchange process taking place within the crystals in a surface layer of the article such that sodium ions from an external source are exchanged for lithium ions in the crystal phase thereby causing compressive stresses to be set up in the surface layer.

5 Claims, 1 Drawing Figure

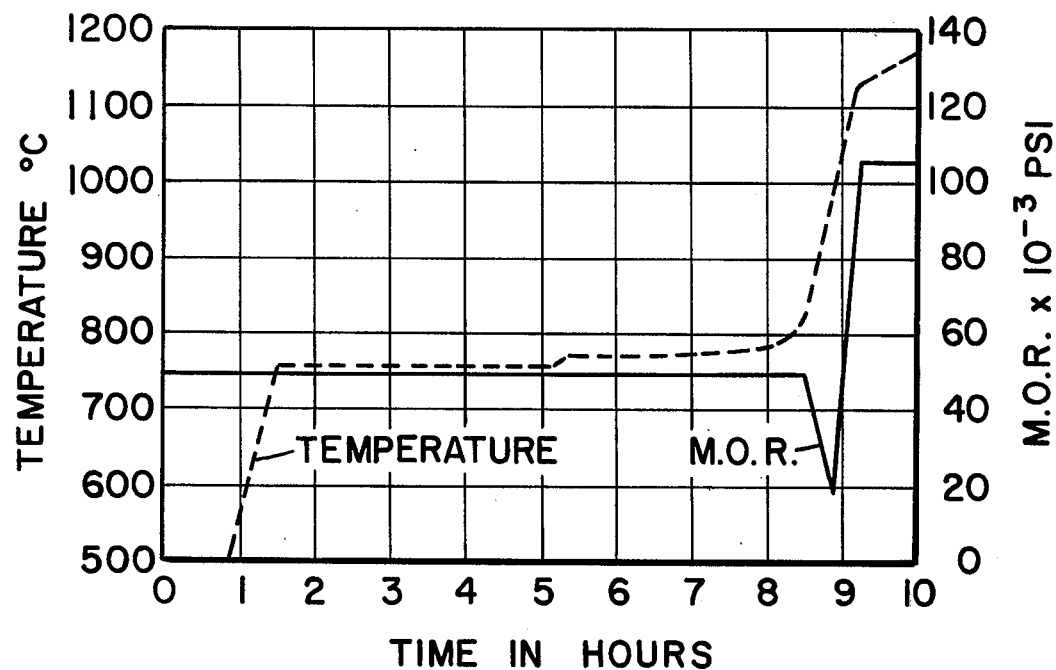

SODIUM ION-EXCHANGE ON SURFACE OF BETA-SPODUMENE

This application is a continuation-in-part of my pending application, Ser. No. 365,117, filed May 5, 1964 and now abandoned.

The production of glass-ceramic articles involves the carefully controlled crystallization in situ of a glass article. Thus, a glass-forming batch commonly containing a nucleating agent is melted, the melt simultaneously cooled to a glass and an article of desired dimensions shaped therefrom, and, thereafter, this glass article is exposed to a particular heat treating schedule which first causes the development of nuclei in the glass that provide sites for the growth of crystals thereon as the heat treatment is continued.

Inasmuch as the crystallization is the result of substantially simultaneous growth on essentially countless nuclei distributed throughout the glass, a glass-ceramic article is composed of relatively uniformly-sized, fine-grained crystals homogeneously dispersed in a glassy matrix with the crystals constituting the predominant portion of the article. Glass-ceramic articles are normally defined as being greater than 50% by weight crystalline and, frequently, are actually greater than 90% by weight crystalline. Since glass-ceramic articles are very highly crystalline, the chemical and physical properties thereof are usually quite different from those of the parent glass and are more nearly characteristic of crystalline ceramic articles. Also, it will be recognized that this high crystallinity will result in a residual glassy matrix which is very small in quantity and having a composition quite different from that of the parent glass since the components comprising the crystals will have been precipitated therefrom.

A detailed study of the theoretical considerations and the practical aspects inherent in the production of glass-ceramic articles along with a discussion of the crystallization mechanism involved can be found in U.S. Pat. No. 2,920,971 and reference is made thereto for further explanations of these factors. That patent defines a glass-ceramic article as being predominantly crystalline, i.e., greater than 50% by weight crystalline. As will be readily recognized, the crystal phases produced in glass-ceramic articles are dependent upon the composition of the original glass and the heat treatment applied thereto. Glass-ceramic articles containing beta-spodumene as the primary crystal phase are described in the above patent.

While there is no consistent pattern, the characteristic strength of a glass-ceramic material is frequently greater than that of the parent glass material from which it is produced. Thus, it is common to observe an increase in abraded strength from 5,000 psi in the original glass to 10,000–12,000 psi in the glass-ceramic state. It is however, frequently desirable to further increase this inherent strength. This is particularly true in connection with such articles as kitchen utensils, which may be subjected to sharp impacts, and other articles which may be subjected to severe loading on occasion.

There are established commercial methods wherein the chemical composition of a glass body or glass surface may be altered to modify such characteristics as electrical resistivity, chemical durability, color and wettability. A thermochemical technique known as staining involves exchange of copper or silver ions for alkali metal ions from the glass to produce coloration within the glass surface. Other chemical treatments include leaching and dealkalization wherein glass constituents are selectively dissolved or extracted to produce at least a surface layer of glass of new composition.

It is also known to increase the mechanical strength of a glass article by development of a compressively stressed surface layer on the article. This is normally a relatively thin layer extending uniformly over the article surface and having compressive stresses induced concomitant with and balanced by tension in the interior of the glass article.

Traditionally, such strengthening has been accomplished by a thermal treatment known as tempering in which the surface of a glass body is suddenly chilled from an elevated temperature. More recently, chemical strengthening techniques have been disclosed wherein compressive stresses are developed by ion exchange in a surface layer on a glass body.

In accordance with one practice, lithium ions are exchanged for sodium ions or potassium ions above the strain point of the glass to synthesize a surface layer of lower expansion coefficient whereby compressive stresses develop on cooling. In another form of ion exchange, ions of large ionic radius are introduced into the glass in exchange for smaller ions from the glass to produce compressive stresses which may be released by heating the glass to a temperature at which viscous flow and molecular rearrangement occur.

The diffusion of ions in any medium is a direct function of the structure of the medium itself. Hence, whereas a crystal has a long range ordered structure of ions, glass has only short range order and has even been deemed to consist of a random network of ions. This basic difference in structure greatly affects the ability of ions to diffuse therein.

The structure of glass is characterized by a network or framework composed of polyhedra of oxygen centered by small ions of high polarizing power (e.g. $Si^{+4}$, $B^{+3}$, $Al^{+3}$, $Ge^{+4}$, $P^{+5}$). These polyhedra are arranged in a generally random fashion so that only short range order exists. Thus silica glass is thought to be composed of a random network of $SiO_4$ tetrahedra, all of whose corners are shared with one another. In silicate glasses containing modifying oxides (e.g. $Na_2O$, $K_2O$, MgO, CaO, BaO, etc.) some of the shared corners (Si-O-Si bonds) are believed broken and oxygen ions are formed which are connected to only one silicon ion. The modifying ions remain in interstitial positions or structural vacancies. In modified aluminosilicate glasses, non-bridging oxygen ions are believed less common because as modifying ions are added to silicate glasses aluminum replaces silicon in the threedimensional corner shared tetrahdearal network and the modifying ions remain in the interstices with the retention of charge balance.

In either case the larger ions of lower valence (modifiers) are thought to occur geometrically in interstitial positions within the basic silicate or aluminosilicate framework. They can thus be considered as completely or at least partially surrounded by linked framework silica tetrahedra. In other words, these ions can be considered as present in "structural cages" in the network. It is this randomness of structure, coupled with the high mobility of the alkali metal ions, which is believed to account for the ion exchange in glasses.

In contrast to the randomness of a glassy structure with its short range order of ions only, crystals have a set lattice of ions which acts to identify each crystal. The pattern of the ions is fixed and this pattern is repeated throughout the structure. Thus, in general, the ions of a crystal are so tightly held that the substitution of one ion for another within the lattice, as heretofore understood and practiced, requires the existence of a peculiar crystal structure or melting and subsequent recrystallization thereof. These phenomena are explained in the following two paragraphs. However, it should be noted that neither of these phenomena results in developing a surface compressive stress layer on the body so as to improve the mechanical strength thereof.

The concept of exchanging ions within a crystal structure has been appreciated for many years. The term "ion exchange", as commonly used, refers to replacement reactions in clay and zeolitetype materials carried out in aqueous solutions at temperatures below 100° C. These materials generally consist of alternating, parallel, essentially two-dimensional layers which are stacked together with interlayer spaces therebetween. To maintain electroneutrality between these layers, cations are incorporated into the interlayer spaces. The extent and rate of exchange in these materials is a function not only of the concentration of the exchanging species but also of the structure of the crystalline phase undergoing exchange. When these materials are suspended in an aqueous solution which can penetrate between the layers, these cations are freely mobile and can exchange with cations present in the solution. Hence, the cation exchange capacity of these materials arises principally from the replacement of cations at defined positions in the interlayer spaces. These interlayer spaces can be likened to channels and it will be apparent that this type of low temperature ion exchange will occur between the loosely bonded ions in a crystal and those in a solution only if there is a suitable channel within the crystal to allow diffusion to take place.

Isomorphous substitution in crystals involves the replacement of the structural cations within the crystal lattice by other cations. This type of substitution may be regarded as a form of ion exchange but the accomplishment thereof requires crystallizing the materials from melts of the appropriate composition. However, the amount and type of isomorphous substitutions can often be very important in affecting the character of a material which is to be subsequently subjected to the conventional low temperature ion exchange reaction described above.

The instant invention contemplates the use of high temperature ion exchange to effect substitutions within the crystalline lattice to thereby produce materials similar to those secured through isomorphous substitution. However, in contrast to glasses, high temperature ion exchange in crystals is much more restricted. The various ion species are specifically located in defined positions within the lattice. When an ion leaves a crystalline position, the position is generally filled by another ion from an external source of ions. The geometry of the crystals often restricts the size of the replacing ion. Isomorphous substitutions in the crystal can only sometimes be of help in determining which ion pairs are exchangeable under the rigid conditions imposed by the long range repetitive order of crystals. Thus, for example, sodium ions can replace lithium ions in the beta-spodumene crystal structure but this exchange cannot take place in the beta-quartz or beta-eucryptite solid solution structure where the sodium ion appears to be too large for the structure to tolerate and the crystalline structure is destroyed if the exchange is forced to take place. As opposed to this, the sodium-for-lithium ion exchange can always be carried out in aluminosilicate glasses without any phase change.

Hence, in short, crystals, because of their definite geometry, impose stringent limitations upon ion exchange. Glasses, on the other hand, because they are random structures capable of incorporating almost all chemical species in a substantial degree, demonstrate no such basic restrictions.

Of course, the ability of a crystalline phase to accept another cation to replace an ion already in its structure through an ion exchange mechanism is not necessarily useful. Many such exchanges will not lead to compressive stress and consequent strengthening. When strength is the desird goal, it is necessary to tailor the exchange to produce compressive stress in the exchanged layer. The compressive stress may arise through crowding of the existing structure or through transformation of that structure to one which comes under compression by some other mechanism; e.g., difference in coefficients of thermal expansion or density changes.

Thus, silica glasses and crystalline ceramics are two different types of material so inherently and fundamentally different, any correlation of behavior or properties is normally unexpected. The various chemical and thermochemical treatments utilized on glass articles are usually ineffective with crystalline-type ceramics, or produce quite different effects. Likewise, methods of thermally treating glasses do not normally have a counterpart in ceramics because of the distinct difference in physical properties and structure.

Quite unexpectedly then, I have now discovered that ion exchange can be effected between a sodium ion-containing material in contact with a glass-ceramic article containing beta-spodumene as the primary crystal phase and the lithium ions of the beta-spodumene crystals within such article to chemically alter in situ the crystal phase. I have further found that sintered bodies tend to physically disintegrate when treated in this manner, but that such tendency is avoided or much less pronounced in glass-ceramic articles having the fine grained crystal phase that is characteristic of well-developed glass-ceramic materials. As a result of such discoveries, it is possible to produce a glass-ceramic material of one composition and, by subsequent chemical treatment, produce a glass-ceramic material of different chemical composition and physical properties within at least a surface layer on the article.

I have further found that a glass-ceramic material containing a lithium-aluminum-silicate crystal phase identified as beta-spodumene can be strengthened to a remarkable degree by ion exchange resulting from thermochemical treatment. Strangely enough, however, this strengthening capability is of a selective nature; that is, peculiar to, and uniquely associated with, certain crystals or crystal structure. Thus, it has been found that a glass-ceramic containing a metastable beta-eucryptite crystal phase is not strengthened by such ion exchange whereas the same material after thermal conversion of the crystal phase to the beta-spodumene form is readily strengthened.

The term "beta-spodumene" has been used to designate a crystal that is now known to be in the trapezohedral class of the tetragonal system, that has the formula $Li_2O \cdot Al_2O_3 \cdot 4SiO_2$ and that is a high temperature form of alpha-spodumene formed by heating the latter to a conversion temperature on the order of 700° C. Likewise, the term "beta-eucryptite" has been used to designate a crystal in the trapezohedral class of the hexagonal system that has the formula $Li_2O.Al_2O_3.2SiO_2$ and is a high temperature form of alpha-eucryptite. In lithium-aluminum-silicate glass-ceramic materials, however, the crystal phase does not strictly conform to either of such naturally occurring crystals. Rather, it is more in the nature of a solid solution corresponding generally to the formula $Li_2O.Al_2O_3.nSiO_2$ where "$n$" may vary from about 2 up to 7 or more depending on the silica content of the parent glass. There is evidence that ions such as magnesium may also appear in the crystal phase if present in the glass. However, an X-ray diffraction pattern invariably indicates a crystal in the trapezohedral class in either the hexagonal or tetragonal system. Accordingly, it has become customary, in identifying glass-ceramics, to term those lithium-aluminum-silicate crystal phases that are classifiable in the trapezohedral class of the hexagonal system as beta-eucryptite crystal phases and those that are classifiable in that class of the tetragonal system as beta-spodumene crystal phases. That practice is followed here.

Where the oxide stoichiometry in the crystal is such that the coefficient "$n$" is less than about 3.5 in the formula $Li_2O.Al_2O_3.nSiO_2$, a stable beta-eucryptite type crystal phase is observed. With larger proportions of silica ("$n$" from about 3.5 up to 7 and higher), a beta-eucryptite type crystal develops initially at temperatures of about 800° C. but is of a metastable nature. This means that it transforms into a beta-spodumene type crystal when heat treated at higher temperatures on the order of 900°-1150° C. I have found that, in general, lithium-aluminum-silicate glass-ceramic materials do not lend themselves to strengthening when the crystal phase is of the metastable beta-eucryptite form, but readily strengthen when the crystal phase is of the beta-spodumene type, that is classifiable in the tetragonal system. Thus, the basic considerations for strengthening of this type of glass-ceramic material appear to be the presence of an exchangeable ion (lithium) in the crystal, a crystal in the tetragonal system, and a fine grain size crystal characteristic of well-developed glass-ceramic materials.

It is not fully understood why the beta-spodumene type crystal can be strengthened through an ion exchange reaction whereas the metastable form of beta-eucryptite cannot, although the chemical formulation of each is the same. However, it is believed that the mechanism therefor is founded upon the differences in crystal structure inherent in each, as noted by B. J. Skinner and H. T. Evans, Jr. in "Crystal Chemistry of β-Spodumene Solid Solutions on the Join $Li_2O.Al_2O_3-SiO_2$", *American Journal of Science,* Bradley Volume, Vol. 258-A, pp. 312-324 (1960). In that publication they proposed a model for beta-spodumene comprising an arrangement of atoms in which structural channels are present that extend continuously through the lattice. Such a structure is not present in the beta-eucryptite type crystal. Therefore, whereas the manner in which the ion exchange reaction occurs in the beta-spodumene type crystal has not been rigidly proven, I believe that a possible explanation therefor can be founded in the presence of these structural channels, hypothesized by Skinner and Evans, which provide means for the movement of lithium ions under the influence of a chemical and/or physical potential such as a bath of a molten sodium salt.

Based on these and other discoveries, by invention resides in a glass-ceramic article which is predominantly crystalline and characterized in that at least a portion of the crystal phase (beta-spodumene) is chemically altered in situ by an exchange of cations within the parent crystal to synthesize a crystal phase of modified chemical composition. The invention further resides in a method of producing such a chemically altered glass-ceramic article by contacting a glass-ceramic body having a crystal phase containing an exchangeable cation with a material containing a cation exchangeable therewith for a time sufficient to effect an exchange between such ions and thereby chemically synthesize a new crystal composition within the glass-ceramic material. Preferably, the exchange is of such a nature that a relatively large cation (sodium ion) is introduced into a surface layer of the glass-ceramic article at a temperature such that the crystal structure remains unchanged and compressive stresses are developed within such surface layer to produce a strengthened glass-ceramic article.

Reference to a larger exchangeable cation in this application means a positive or metallic type ion, viz., a sodium ion, that is larger in ionic radius than the lithium ion and is capable of migrating or diffusing within a crystalline or a vitreous medium. The movement of the ions is occasioned by the combined activation of a chemical force, in this case a differential in ion concentration between the glass-ceramic and the contacting material, and a physical force which may be heat alone or in conjunction with an electrical potential. The movement will normally continue until the activating force is removed or an equilibrium condition is reached.

As in the case of glasses, ion exchange may be effected in only a portion of an article, if desired. In particular, it may be effected only in a thin surface layer where the purpose is to develope a compressively stressed layer. Such an exchange may be effected by thermal means and will normally involve a high degree of exchange at the very surface with the degree diminishing in a gradient manner inwardly in the article.

Alternatively, exchange may be effective throughout the article. This may be achieved, as in glasses, by using an electrical potential as an activating influence. Such exchange will produce a new article, but not compressive strengthening.

The ion will exchange within the beta-spodumene glass-ceramic articles is evidenced by a change in chemical analysis, X-ray diffraction pattern, and physical properties. After ion exchange, an X-ray diffraction pattern will show all of the peaks characteristic of the original crystal phase, although slightly shifted in location and intensity. This indicates distortion, but not destruction, of the original crystal cell resulting from the larger sodium ions being crowded into sites previously occupied by lithium ions.

In its broadest aspect, the present invention is concerned with the synthesis of a chemically altered beta-spodumene crystalline phase within a predominantly crystalline glass-ceramic body by ion exchange. In practice, a material containing an exchangeable sodium ion is brought in contact with a glass-ceramic surface for a sufficient time to effect exchange between the lithium ion from the crystal phase of the glass-ceramic material and the sodium ion from the contacting material. The amount of exchange varies with time in accordance with diffusion principles. In general, a temperature of at least 200° C. is necessary to effect any appreciable degree of thermal exchange and considerably higher temperatures may be required depending on the material involved. The rate of exchange generally increases with temperature and it is therefore desirable to operate at higher temperatures, for example on the order of 600° C. or even higher in some cases. However, care must be taken to avoid chemical attack or other deleterious effect of the treating material on the glass-ceramic. For example, molten salts frequently tend to chemically attack or etch such a material during treatment at high temperatures.

The invention is of particular utility in the production of strengthened glass-ceramic articles. Based on my earlier mentioned discovery, a glass-ceramic containing a beta-spodumene crystal phase is utilized for this purpose.

In accordance with my invention, a portion of the lithium ions of the beta-spodumene solid solution in a surface layer on the glass-ceramic article is replaced with sodium ions. This chemical change in the crystal composition with the accompanying expansion of the structure thereof described above leads to the production of compressive stresses in the modified surface layer with a consequent increase in the mechanical strength of the article. The replacement of the small-diameter lithium ion with the larger-diameter sodium ion is on a one-for-one basis such that the total concentration of alkali metal ions molarwise is the same before and after the ion exchange. Therefore, it can be recognized that the concentration of sodium ions in the surface layer will be much greater than in the interior portion of the article with the opposite situation obtaining with respect to the lithium ion concentrations. And, it is apparent that these differences in the sodium and lithium ion concentrations produce the desired compressive stresses.

To effect the desired substitution or replacement of ions, any convenient source of sodium ions is brought into contact with the surface of the glass-ceramic article at a suitable temperature for ion exchange and maintained in such contact for a time sufficient to effect the desired degree of ion exchange. In general, the exchange appears to be diffusion controlled so that the amount of exchange increases with the square root of time and the time for a given amount of exchange correspondingly decreases with increase in temperature.

By way of further describing the invention, reference is made to the following specific examples and the accompanying drawing described therein:

EXAMPLE I

Raw materials were mixed to form a glass batch having the following oxide composition on a calculated weight percent basis: $SiO_2$ 69.7%, $Na_2O$ 0.3%, $K_2O$ 0.1%, $Li_2O$ 2.6%, $MgO$ 2.8%, $Al_2O_3$ 17.9%, $ZnO$ 1.0%, $TiO_2$ 4.8%, and $As_2O_3$ 0.9%. The batch was melted in a conventional glass melting unit operating at a maximum temperature of about 1600° C. and drawn into quarter-inch diameter cane. The drawn cane was cut into four inch lengths to provide suitable samples for subsequent heat treatment and strength measurement purposes.

The cane samples thus produced were converted from the glassy to the glass-ceramic state by heat treatment in accordance with the following schedule:
Heat at 300° C./hour to 750° C.
Heat 100° C./hour to 850° C.
Heat 300° C./hour to 1080° C.
Hold 2 hours at 1080° C.
Cool rapidly to room temperature.

The structure of the crystallized cane samples was examined utilizing X-ray diffraction analysis and electron microscopy. Each sample examined was determined to be about 90% by weight crystalline with beta-spodumene solid solution making up about 85% and the remainder consisting of rutile and as yet an unidentified magnesium aluminate phase.

As was observed above, the very high crystallinity of the glass-ceramic articles of this invention results in the residual glassy matrix being very small in quantity and having a composition quite different from the parent glass since the components constituting the crystals will have been precipitated therefrom. Therefore, in the preferred embodiment of the invention, as is exemplified by the composition of Example 1, substantially all of the alkali metal ions will be part of the structure of the beta-spodumene solid solution and other crystal phases present having a residual glassy matrix which is highly siliceous. Some alkali metal ion in excess of that included in the crystal phases can be tolerated but amounts greater than about 5% by weight in excess frequently result in a coarse-grained rather than the desired fine-grained article. A large excess of $Li_2O$ will also hazard spontaneous crystallization of the glass melt when being cooled and shaped. Hence, although in the preferred embodiment of the invention alkali metal ions are completely absent from the residual glassy phase, a very minor amount thereof can be present therein. These "contaminant" lithium ions in the residual glassy matrix can also, of course, be exchanged with sodium ions during the subsequent ion exchange reaction but, inasmuch as the total glass content of the article is small and the number of these lithium ions is very small, the effect of such an exchange upon the properties of the article would be virtually negligible when compared to the exchange taking place in the beta-spodumene crystals.

The resulting glass-ceramic cane samples were then divided into groups of 6 for further heat treatment in a molten salt bath composed of 85% $NaNO_3$ and 15% $Na_2SO_4$. Each set of samples was then immersed in the salt bath and treated in accordance with an individual time temperature schedule for comparison purposes.

After removal from the bath and cleaning, each heat treated cane sample was subjected to a severe form of surface abrasion wherein ten cane samples were mixed with 200 cc. of 30 grit silicon carbide particles, and subjected to a tumbling motion for 15 minutes in a Number 0 ball mill jar rotating at 90–100 rpm. Each abraded cane sample was then mounted on spaced knife edges in a Tinius Olsen testing machine and a continuously increasing load applied opposite to and intermediate of the supports until the cane broke in flexure. From the measured load required to break each cane a modulus of rupture value was calculated for the individual cane and an average value determined for each set of samples.

Since the strength of these treated articles is dependent upon the surface compression layer introduced therein through the ion exchange process and because substantially all service applications for these articles will contemplate some surface injury thereto, the permanent or practical strength demonstrated by these articles is that which is retained after considerable surface abrasion. Therefore, the above-described tumble abrasion test is one which was first developed by the glass industry to simulate the surface abuse which a glass article can experience in field service and is believed to be equally applicable with glass-ceramic articles. Preferably, the depth of the surface compression layer resulting from the ion exchange is at least 0.001" to secure a high abraded strength to the article. This depth of layer can be measured quite readily by electron microscope examination of a cross-section of the article.

Several groups of samples were treated at 525° C. for varying lengths of time to determine the influence of this factor on strengthening. The following table sets forth the calculated MOR values (multiplied by $10^{-3}$) in pounds per square inch for each set of samples together with the identifying time of treatment for the samples:

TABLE

| Time | Average M.O.R. |
|---|---|
| 0 minute | 12.0 |
| 15 minutes | 18.0 |
| 30 minutes | 33.4 |
| 1 hour | 42.9 |
| 2 hours | 71.6 |
| 4 hours | 78.2 |
| 16 hours | 79.4 |

Several further groups of cane samples were treated for 30 minutes at different temperatures to illustrate the effect of varying temperature on the degree of strengthening attained. The following table sets forth these data in the same manner as above except that time is replaced by temperature:

TABLE

| Temperature | Average M.O.R. |
|---|---|
| 475° C. | 19.1 |
| 500° C. | 27.5 |
| 525° C. | 33.4 |
| 550° C. | 66.3 |

The data presented above illustrates that the strength of glass-ceramic bodies containing beta-spodumene as the principal crystalline phase can be increased several fold by low temperature ion exchange strengthening. The illustrated ion exchange is between lithium ions from the beta-spodumene crystal and sodium ions, the temperature being such that the crystal structure remains essentially unchanged physically except for the development of compressive stresses in the layer wherein exchange occurs. The data further illustrate that, within limits, the degree of strengthening attainable increases with both temperature and time of treatment.

EXAMPLE II

To illustrate the practical advantages of the invention more directly, a group of ten-cup percolator bowls were blown from the glass of Example I and thereafter converted to the glass-ceramic state by heat treatment in accordance with the heat treating schedule set forth in that Example. The bowls were produced as nearly identical as manufacturing tolerances permitted.

A group of 6 bowls was set aside as a standard of comparison. A second group of 12 bowls was immersed in the molten salt bath of Example 1 at a temperature of 475° C. for a period of 3 hours. The lower temperature and longer time of treatment were selected to avoid possible chemical attack from the salt material on the glass-ceramic surface during treatment, the tendency for such attack increasing with temperature of the bath. Both sets of bowls were then subjected to a uniform degree of abrasion on the surface of the ware opposite that to be impacted in subsequent testing. The abrasion was accomplished by rubbing the surface with 150 grit abrasive paper under uniform time and pressure conditions. After abrasion, each bowl was then mounted in an impact testing apparatus and subjected to successive impacts of increasing force until breakage occurred. The apparatus included a fiber board lined V-block in which the ware was firmly supported and a plastic ball impact hammer weighing 1⅛ lb. suspended at the end of a 41¾ inch pendulum arem weighing ¾ lb. Each bowl was mounted in identical manner so that impact occurred on the wall of the bowl along a line of maximum diameter. The impact energy in foot pounds required to cause breakage of the bowl was taken as the impact strength of the samples for purposes of comparison and evaluation. The average impact strength of the untreated bowls was 0.26 foot pounds, while the average impact strength of the strengthened bowls was 1.94 foot pounds.

By way of further illustrating the impact strengths of such ware, two groups of skillets were produced from the same glass and treated in accordance with the same ceraming schedule. These were subjected to a ball drop impact test wherein a ⅛ lb. steel ball was dropped on the center of the bottom surface of the ware, the ball being dropped from increasing heights until breakage occurred. In this test, the untreated skillets showed an average impact strength of 0.30 foot pounds while the treated ware showed an average impact strength of 2.41 foot pounds.

The data demonstrate that an ion exchange treatment as indicated imparts an impact strength increase in the treated ware of at least five fold.

EXAMPLE III

It is known that glasses of the lithia aluminosilicate type which undergo nucleated crystallization to form glass-ceramic materials containing a beta-spodumene as their principal crystalline phase undergo various changes in the course of such conversion from glass to glass-ceramic. In particular, such glasses become nucleated through the heat treatment at temperatures of about 750°–800° C., such nucleation occurring in the one hour heat treatment from 750° C. to 850° C. in the schedule set forth in Example 1. It is also known that, in the course of the crystallization process, a beta-eucryptite crystal phase initially forms above about 800° C. and is converted to the beta-spodumene type crystal by additional heat treatment at somewhat higher temperatures. In order to determine the effect of ion exchange at these various stages in the crystallization process, a series of glass bodies was fired in a heat-treating furnace in accordance with a predetermined time-temperature schedule. Samples were withdrawn from the furnace at various stages of the heat treatment and subsequently given an identical ion exchange treatment, (immersion in a molten sodium salt bath for 10 minutes at 580° C.), with average M.O.R. values being determined for each set of samples in accordance with the procedure of Example 1. The glass employed was similar to that of Example 1 and had the following calculated composition: $SiO_2$ 68.4%, $Al_2O_3$ 20.7%, $Li_2O_2$ 5.1%, $TiO_2$ 4.8%, $Na_2O$ 0.3%, $K_2O$ 0.1%, and $As_2O_3$ 0.6%.

The results of this exploratory test are graphically illustrated in the accompanying drawing wherein time in hours is plotted on the horizontal axis, temperature in degrees C. is plotted on a vertical axis at the left-hand side of the drawing and M.O.R. times $10^{-3}$ psi is plotted on a vertical axis at the right-hand side of the drawing. The dotted line illustrates the manner in which furnace temperature increased with time. The solid line illustrates the manner in which the ware is rendered capable of strengthening by ion exchange at various heat treating temperatures and stages of physical change. More specifically, the value of 50,000 psi at 0 hours is the inherent strengthening capability of the glass prior to any change and under the conditions of ion exchange. It will be observed that this remains essentially constant through the nucleation stage (750° C.-800° C.) up to the point at which the beta-eucryptite crystal phase starts to develop as shown by the break in the temperature at about 800° C. and the corresponding but opposite break in the strength line. The beta-eucryptite crystal phase developed relatively rapidly and, concurrently, the strengthening potential of the material dropped to under 10,000 psi. However, as the beta-eucryptite phase changed over to the beta-spodumene phase at temperatures around 1100° C. and above, the strengthening potential rapidly changed to slightly above 100,000 psi, or about double that of the parent glass.

X-ray diffraction analysis and electron microscope examination determined the finally crystallized glass bodies were greater than 90% by weight crystalline with beta-spodumene solid solution comprising essentially all thereof, there being about 5% by weight rutile present.

These data rather clearly demonstrate the distinction between glass-ceramics containing beta-eucryptite as a primary phase and those containing beta-spodumene as a primary phase. In general, the former do not have a strengthening potential whereas the latter generally do have a rather high strengthening potential with respect to low temperature type ion exchange treatment. As described and claimed in a companion application, there is a type of beta-eucryptite crystal phase which does have a limited strengthening potential by such treatment.

EXAMPLE IV

A glass having the following composition in parts by weight: 62.5 $SiO_2$, 24.0 $Al_2O_3$, 4.9 $Li_2O$, 4.8 $TiO_2$, 0.5 F, 1.4 CaO, was melted, drawn into cane, and converted to a glass-ceramic material by heat treatment in accordance with the schedule of Example 1. The resulting glass-ceramic cane had a primary crystalline phase of beta-spodumene. The ceramed cane was then divided into two groups for thermochemical ion exchange treatment in a 85% $NaNO_3$ - 15% $Na_2SO_4$ molten salt bath at a temperature of 580° C. One group of samples was withdrawn after a half-hour treatment and the other group after a three hour treatment in the bath. Calculated average M.O.R. values for the two groups were 122,000 psi for the half-hour treatment group and 129,000 psi for the three hour treatment group, the latter not being significantly different from the former.

Electron microscope examination and X-ray diffraction analysis demonstrated the heat treated cane was about 80% by weight crystalline consisting of about 70% beta-spodumene solid solution with the remainder composed of rutile and an unidentified calciumcontaining crystal.

As has been explained above, this invention is founded upon the exchange of sodium ions for lithium ions in the crystal structure of beta-spodumene. That such an exchange does, indeed, take place is confirmed through X-ray diffraction analyses of the surface crystals prior to and subsequent to the ion exchange reaction. The replacement of lithium ions by sodium ions is evidenced in the following table which records several of the d-spacings and the intensities observed thereat in an X-ray diffraction pattern made of the surface crystallization of Example 1 before and after the ion exchange reaction. The intensities are arbitrarily reported as very strong (vs), strong (s), moderate (m), and weak (w).

| Before Exchange | | 85% $NaNO_3$ - 15% $Na_2SO_4$ 4 Hours at 525° C. | |
|---|---|---|---|
| d | I | d | I |
| 5.9 | w | 5.7 | w |
| 4.6 | w | 4.5 | w |
| 4.4 | w | 4.4 | w |
| 3.9 | mw | 3.9 | m |
| 3.48 | vs | 3.47 | vs |
| 3.40 | mw | — | — |
| 3.25 | w (rutile) | 3.25 | w (rutile) |
| 3.15 | w | 3.15 | w |
| 2.72 | w | — | — |
| 2.30 | w | 2.29 | w |
| — | — | 2.24 | w |
| 2.11 | w | 2.10 | w |
| 1.94 | vw | 1.92 | w |

This table unequivocally illustrates the retention of the fundamental beta-spodumene crystal structure during the ion exchange reaction. Thus, the peaks in the diffraction pattern which are characteristic of the beta-spodumene crystals before the ion exchange are observed after the exchange but their spacings and intensities vary significantly, thereby reflecting a distortion and expansion of the crystal cell structure but not the destruction thereof.

EXAMPLE V

Quarter inch diameter cane samples of sintered beta-spodumene were prepared from two different raw material batches by slip casting and firing. One batch was composed of 75% petalite, a naturally occurring mineral corresponding approximately to the formula $Li_2O.Al_2O_3.8SiO_2$, and 25% of the beta-spodumene glass-ceramic described in Example I; the other of 72% petalite and 28% of spodumene calcined to the beta form.

The raw materials were milled, mixed with water to form a castable slip and slip cast in rod or cane form. After drying, the cast rods were fired at 1275° C. to form sintered beta-spodumene bodies as described in U.S. Pat. No. 3,096,159. These were ground to standard size for ion exchange treatment and strength measurement.

The sintered cane samples were immersed in an 85% $NaNO_3$ - 15% $Na_2SO_4$ molten salt bath operating at a temperature of 450° C. After several minutes in the bath, samples from both batches began to disintegrate. This might indicate that ion exchange was occurring but that the sintered bodies were unable to withstand the stresses developed thereby.

I claim:

1. A method for making a unitary glass-ceramic article of high strength wherein the crystal content thereof constitutes at least 50% by weight of the article with a surface compressive stress layer and an interior portion which comprises contacting a glass-ceramic article consisting essentially of $Li_2O$, $Al_2O_3$, and $SiO_2$, wherein the crystal phase therein consists essentially of beta-spodumene solid solution, at a temperature above 200° C. with a source of exchangeable sodium ions for a period of time sufficient to replace at least part of the lithium ions of said beta-spodumene solid solution in a surface layer of the article with a corresponding amount of sodium ions, said replacement not changing the essential crystal structure of the beta-spodumene solid solution crystals but thereby effecting a compressively stressed surface layer on the article.

2. A method according to claim 1 wherein $TiO_2$ is present in the glass-ceramic article as a nucleating agent.

3. A method according to claim 1, wherein said article is contacted with a source of exchangeable sodium ions at a temperature between about 200°–600° C.

4. A unitary glass-ceramic article of high strength wherein the crystal content thereof constitutes at least 50% by weight of the article with a surface compressive stress layer and an interior portion consisting essentially of $Li_2O$, $Al_2O_3$, and $SiO_2$, wherein the crystals of said interior portion consist essentially of beta-spodumene solid solution and the crystals of said surface compressive stress layer consist essentially of beta-spodumene solid solution, the crystal structure of said latter crystals being essentially unchanged but in at least a portion of which the proportion of lithium ions is less with a corresponding increase in an amount of sodium ions.

5. A glass-ceramic article according to claim 4 wherein $TiO_2$ is present as a nucleating agent.

* * * * *

UNITED STATES PATENT AND TRADEMARK OFFICE
CERTIFICATE OF CORRECTION

PATENT NO. : 4,074,992
DATED : February 21, 1978
INVENTOR(S) : Raymond O. Voss

It is certified that error appears in the above-identified patent and that said Letters Patent are hereby corrected as shown below:

Column 2, line 51, "threedimensional" should be -- three-dimensional --.

Column 3, line 13, "zeolitetype" should be -- zeolite-type --.

Column 3, line 21, "concentration" should be -- concentrations --.

Column 5, line 67, "by" should be -- my --.

Column 6, line 40, "effective" should be -- effected --.

Column 10, line 7, "arem" should be -- arm --.

Column 10, line 60, "Li$_2$O$_2$" should be -- Li$_2$O --.

Column 11, line 60, "calciumcontain-" should be -- calcium-contain- --.

Signed and Sealed this

Eighth Day of August 1978

[SEAL]

Attest:

RUTH C. MASON
Attesting Officer

DONALD W. BANNER
Commissioner of Patents and Trademarks